March 15, 1955  S. P. RETY ET AL  2,704,144
DELIVERY CHUTE
Filed March 28, 1952  3 Sheets-Sheet 1

INVENTORS:
STEPHEN PAUL RETY &
JOHN FREDERICK MOORE
BY:

Chatoin & Company.

ATTORNEYS.

INVENTORS:
STEPHEN PAUL RETY &
JOHN FREDERICK MOORE.
BY:

Chatwin & Company

ATTORNEYS.

United States Patent Office 2,704,144
Patented Mar. 15, 1955

2,704,144

DELIVERY CHUTE

Stephen Paul Rety and John Frederick Moore, London, England

Application March 28, 1952, Serial No. 279,078

Claims priority, application Great Britain July 11, 1951

1 Claim. (Cl. 193—38)

The present invention relates to chutes or ducts and more particularly to chutes or ducts for feeding tablets or other relatively flat articles in succession to processing positions such as for example in packaging machines.

The primary objects of the invention are to produce a chute or track which is capable of accommodating tablets or the like of different sizes within limited ranges and also which is such that broken articles or particles of dust therefrom are ejected before the processing or terminal end of the chute or track is reached, thereby avoiding clogging of the path for the articles down the chute or track.

According to the present invention a chute or track is made up of a pair of laterally spaced wall elements having on their inner faces oppositely disposed longitudinal channels each of which tapers outwardly in a direction transversely of the track and towards the other, and means for holding the wall elements in the desired spaced relationship commensurate with the dimensions of the articles to be fed into the terminal position.

It will thus be seen that so long as the chute or track is not truly vertical throughout its length there is no danger of clogging the passage for the articles as particles of dust therefrom, or again any articles broken in their transit down the chute or track, will fall through the space between the walls.

The invention is more particularly described with reference to the accompanying drawings which illustrate by way of example a form of construction particularly suitable for use in feeding tablets in an orderly manner, i. e. in line formation, from a hopper where they have been disposed in a scrambled mass to a processing position in a packaging machine where the tablets are separately housed in pockets formed between strips or webs of cellophane or other material. In the drawings.

Figure 1:
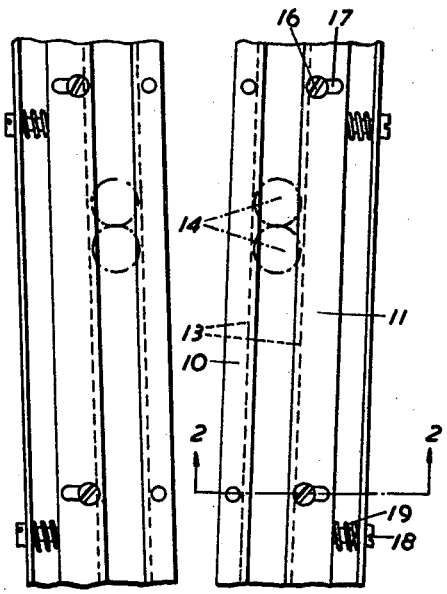
Figure 1 is an elevational view of parts of a pair of chutes disposed at a slight angle to one another for the purpose of feeding two tablets at a time to the processing position.
Figure 2:
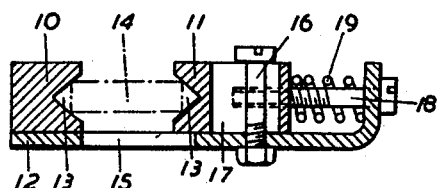
Figure 2 is a section on the line 2—2 of Figure 1.

In the construction illustrated in Figures 1 and 2 each chute is made up of a pair of oppositely disposed walls 10, 11, and one or more base members 12. On the inner faces of the walls 10, 11 are channels 13 of V shape each of which tapers outwardly both transversely of the chute and in a direction towards the other to receive tablets 14.

Alternatively the channels may be substantially of U or semi-circular shape or again they may be semi-elliptical, and from this it will be appreciated that, within predetermined limits, tablets 14 of different superficial areas may be accommodated within a chute or duct of the present invention without the necessity of making any relative adjustment between the laterally spaced walls 10, 11 of the duct, provided that with an increase in superficial area the tablets 14 have a corresponding reduction in thickness.

In the illustrated form however the walls are relatively adjustable transversely of the chute or duct in order to accommodate tablets of different superficial area independently of their thicknesses; for this purpose one wall, e. g. the wall 10, is permanently secured to a base member appropriately slotted longitudinally at 15 to leave the required gap between the walls, or to a number of base members 12 spaced longitudinally of the duct. The other wall is connected to said member or members 12 by longitudinally spaced clamping or locking bolts 16 engaging in slots 17 extending transversely of the chute.

Additionally laterally extending adjusting or gauging screws 18 loaded by springs 19 are provided for the purpose of effecting the required adjustment between the side walls 10, 11 of the chute. Thus to effect adjustment to meet particular requirements, determined by the diameter and thickness of the tablets to be processed, the bolts 16 are unscrewed, the gauging screws 18 are adjusted while the springs 19 hold the parts together whereupon when the gauging operation has been completed the bolts 16 are tightened in their slots 17.

Figure 3:
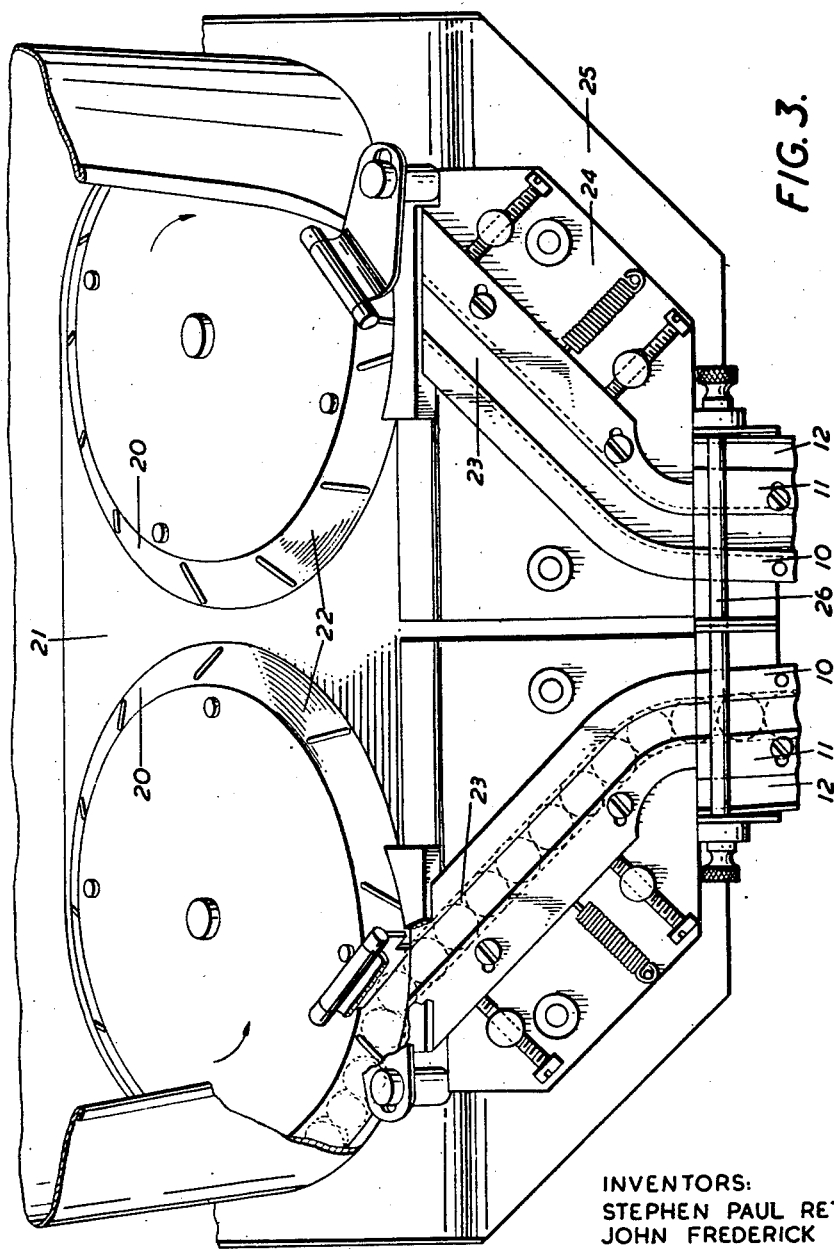
Figure 3 is a perspective view showing a pair of intermediate chutes between a hopper of the machine and the tops of the chutes of Figure 1.
Figure 4:
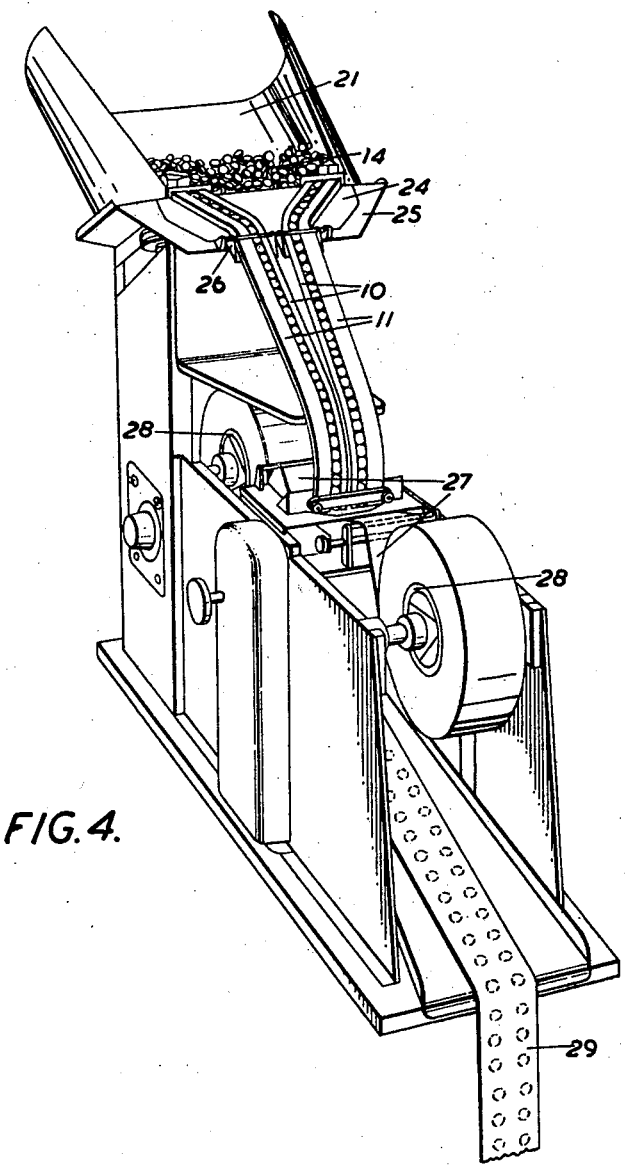
Figure 4 is a perspective view of the packaging machine as a whole.

A chute or chutes of the present invention may constitute part of a packaging machine as shown in Figures 3 and 4 of the drawings wherein discs 20 rotatable about parallel inclined axes in a hopper 21 adapted to receive the tablets 14 in a scrambled mass have annular surfaces 22 adjacent their peripheries, the nature of which is such as to be adapted to convey the tablets upwardly from the scrambled mass in an arcuate path to terminal positions at the top of the hopper where they are deflected gradually into or on to the inlet ends of a pair of chutes 23 the opposed side walls of which are relatively adjustable as in the manner already described. Said inlet ends 23 differ however from the chute construction illustrated in Figures 1 and 2 inasmuch as they are relatively inclined at a greater angle in order to bring them in a small space while they are also mounted on a plate 24 which in turn is rigidly secured to a support 25 for the hopper 21. This support 25 has hinged to it, so as to depend from it at 26 a pair of chutes of the kind illustrated in Figures 1 and 2, the pivotal arrangement being such that the walls of the outlet ends of the chutes 23 carried by the plate 24 which is fixed to the support 25 merge into the walls 10, 11 of the pivotal chutes of Figures 1 and 2 and the outlet ends of the latter are adapted to move to and fro at the processing position for the purpose of releasing tablets 14 one at a time from said outlet or lower ends of the chute. In particular the release of the tablets 14 is governed by the relative movement of a slotted plate (not shown) and the outlet ends of the chutes to bring the slot or slots in the plate into and out of a position or positions vertically below the outlet ends of the chutes, a resiliently yieldable plunger, simultaneously with the conjunction of the slot and a chute exit being engaged with a face of the second tablet in a chute considered from its exit end so as to permit only the lowermost tablet to be released from a chute upon such conjunction.

The machine at the processing end is of the kind wherein packaging material 27, such as plastic material, cellulose, paper metal foil, or other pliable or flexible material, of strip or web form is fed from drums 28 in superposed layers between a pair of heated cylindrical rollers (not shown) either or both of which has or have peripheral pockets which are adapted to receive tablets 14 as they are fed between the converging strips to the bight between the rollers as they interengage under pressure, while in the act of receiving the tablets between them the strips are sealed together by the heated rollers over areas surrounding the tablets, so that they emerge from the machine in the form shown at 29.

A further feature of the present invention is constituted by the provision of a battery of parallel chutes or tracks having different ranges of cross sectional widths, said chutes being laterally displaceable as a unit so that any one or a pair is or are selectively brought into line with chute feeding and delivery means leaving the remainder inoperative.

We claim:

An adjustable chute for pills comprising two side walls arranged in parallel position and each having in its face nearest the other a horizontal V-shaped recess with the apex directed away from the other side wall such that the two recesses serve to receive and act as the sole support for transversely opposite parts of the pills longitudinally slidable therein, a centrally-apertured base member extending longitudinally of the chute and having the two side walls secured on its upper surface such that pills carried by the side walls are spaced from the base member, and means for adjustment of one of the side walls, towards and away from the other transversely of and parallel to the plane of the base member to accommodate different thicknesses and widths of pills, consisting of tightening bolts disposed through transverse slots of the adjustable side wall and through the base member to permit clamping of the adjustable side wall in different positions with respect to the base member, an upturned flange on the base member externally of the adjustable side wall, and spring means arranged between the adjustable side wall and the flange to urge the adjustable side wall towards the other wall.

References Cited in the file of this patent

UNITED STATES PATENTS

| Number | Name | Date |
|---|---|---|
| 582,988 | Hoyte et al. | May 18, 1897 |
| 752,341 | Hopkins et al. | Feb. 16, 1904 |
| 1,320,993 | Townsend | Nov. 4, 1919 |
| 1,644,999 | Hardiman | Oct. 11, 1927 |
| 2,004,349 | Schwab | June 11, 1935 |
| 2,303,976 | Bawcutt et al. | Dec. 1, 1942 |
| 2,325,757 | Ehlers | Aug. 3, 1943 |